April 15, 1930.  T. NEILSON  1,754,961
AIR DIRECTING DEVICE
Filed Nov. 29, 1927
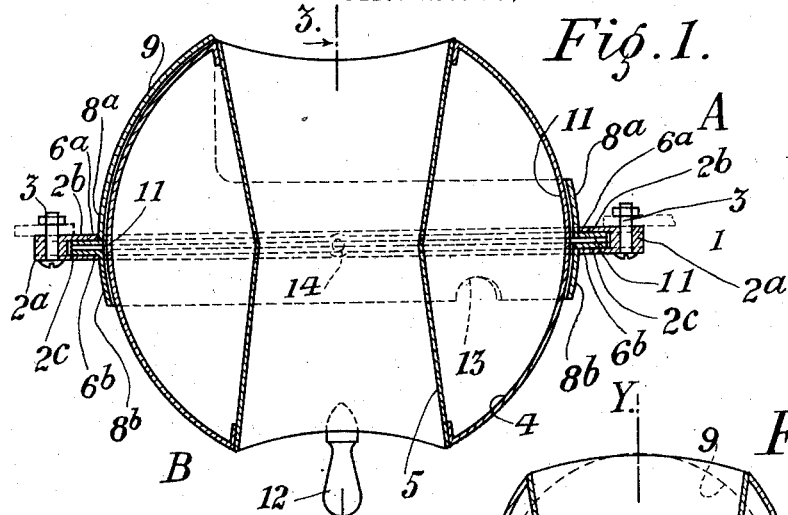
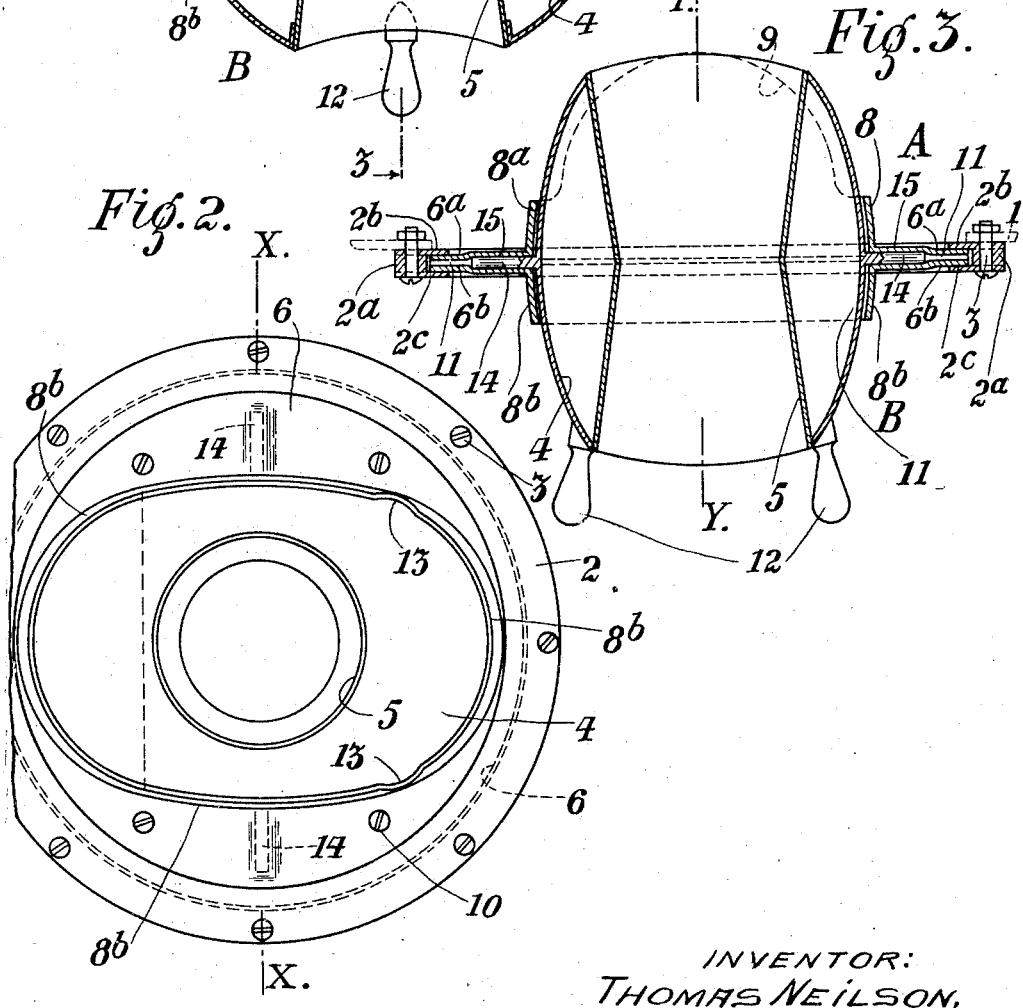
INVENTOR:
THOMAS NEILSON,
BY
ATTORNEYS Patented Apr. 15, 1930

1,754,961

UNITED STATES PATENT OFFICE

THOMAS NEILSON, OF GLASGOW, SCOTLAND

AIR-DIRECTING DEVICE

Application filed November 29, 1927, Serial No. 236,391, and in Great Britain November 7, 1927.

This invention relates to air directing devices for use in connection with ventilating or air supply systems and of the kind in which the air can be directed as desired in any direction through substantially a hemisphere. The present invention constitutes an improvement in the air directing device forming the subject matter of United States Patent No. 1,569,667 granted to the present applicant and which discloses an air directing device comprising a bearing ring rotatable in its own plane and having a socket in which a nozzle is turnable about an axis in the plane of the bearing ring, the nozzle having an air passage through it.

After numerous experiments, I have found a nozzle of ellipsoidal form turning in a part-ellipsoidal socket in the bearing ring to be especially suitable for this kind of air directing device for various reasons of which I mention the following.

The construction facilitates obtaining a good air-tight fit of the nozzle in its socket on account of all the contacting surfaces being curved. The nozzle turns smoothly in the socket.

Owing to the absence of corners the device is strong and durable and the parts can be readily manufactured.

I provide trunnions between the socket and the nozzle on the axis about which the nozzle turns. The presence of these trunnions relieves the socket of stresses when the nozzle is being turned, such stresses being taken by the rim of the bearing ring. This tends to preserve the air-tight state between the nozzle and the bearing ring. Further, any tendency of the nozzle to bind in the socket, should the turning force not be applied in a plan normal to its axis of rotation, is positively prevented.

In order to avoid any humming or singing noises in the device due to the passage of rapidly moving air, I prefer to make the air passage through the nozzle in the form of a Venturi tube. This I have found to obviate noise.

The accompanying drawing shows one embodiment of the invention which will be described, by way of example, with reference thereto.

On the drawing:—

Fig. 1 is a mid-sectional elevation of the air directing device.

Fig. 2 is an inverted plan view thereof, and

Fig. 3 is a sectional elevation of the device on the line 3—3 of Fig. 1.

The numeral 1 denotes the wall of a duct or trunk A along which air under pressure is passing while B is the space to which air is to be supplied.

In the wall 1 a circular opening is cut and round its edge a circular coaming 2, comprising a metal ring $2^a$ and two inwardly projecting flanges $2^b$ and $2^c$ is secured by bolts 3 (see Figs. 1 and 3), so that a groove is thus formed between the flanges.

The nozzle comprises a hollow metal body 4 of substantially ellipsoidal form. An air tube 5 of Venturi form is fitted into and through the nozzle 4, the tube 5 forming air tight joints with the nozzle with whose surface the ends of the tube are flush. One end of the tube 5 opens into the space B while the other opens into the duct or trunk A.

The nozzle is provided with two polar projecting pins 14 in the line of its minor axis, these pins forming trunnions, and is mounted in a bearing ring 6 having a circular periphery fitting rotatably into the groove between the flanges $2^b$ and $2^c$ of the coaming 2.

The bearing ring 6 is made up of two separate parts $6^a$ and $6^b$ (see Figs. 1 and 3) of thin metal, each having a substantially elliptical opening in it. Flanges $8^a$ and $8^b$ whose surfaces correspond in shape to that of the nozzle are formed around the opening in the parts $6^a$ and $6^b$ of the bearing ring 6, respectively. The flange $8^a$ has an extension shown at 9 in Figs. 1 and 3.

Each of the parts $6^a$, $6^b$ is recessed a little, as shown, at two diametrically opposite positions 15 on its plane surface, the recesses in the two parts when placed together forming a pair of bearings for the trunnions 14. The two parts $6^a$ and $6^b$ are secured together face to face by bolts 10 with the flanges $8^a$ and $8^b$ extending in opposite directions and forming together a socket in which the nozzle 4 is supported. Soft packing 11 is placed between the flat parts of the members $6^a$ and $6^b$ and between the socket 8ª, 8ᵇ and the nozzle 4, which is rotatable about the axis X—X in Fig. 2 to form air tight joints.

Two handles 12 are fitted on the nozzle body for its manipulation in a position clear of the path of the air so obviating any whistling or singing noise. The flange 8ᵇ has two indentations 13 in its edge for the reception of the finger tips of an operator.

The nozzle is rotatable about the axis X—X in the bearing ring, i. e. the line of the trunnions 14, and the bearing ring is rotatable about the axis Y—Y, Fig. 3, in the coaming 2. Therefore, by combining the rotation of the nozzle body and of the bearing ring the axis of the tube 5 can be placed along any line substantially within a hemisphere.

By causing the extension 9 of the socket to cover, more or less, the end of the tube 5, the air supply can be regulated.

The provision of the trunnions 14 renders the nozzle rotatable about one axis only, prevents play in the socket and obviates any tendency for the nozzle to bind in its socket.

Various modifications in the shape of the nozzle may be made. The nozzle may for example be an ovaloid in shape.

I claim:—

1. An air directing device comprising, in combination, a bearing ring, means for rotatably supporting said bearing ring, a substantially ellipsoidal nozzle independently rotatable in the bearing ring, an air passage through the nozzle, trunnions on the nozzle in the line of its axis of generation, and bearings, in the bearing ring for the trunnions on which the nozzle can rotate in the bearing ring at right angles to the axis of rotation of the bearing ring.

2. An air directing device comprising, in combination, a bearing ring, a fixed circular coaming in which said bearing ring is rotatable, a substantially ellipsoidal nozzle, a socket therefor in the bearing ring and conforming partially to the shape of the nozzle, trunnions on the nozzle in the line of its axis of generation, bearings in the bearing ring for said trunnions along a diameter of the bearing ring, and a tubular air passage through the nozzle.

3. An air directing device comprising, in combination, a bearing ring, means for rotatably supporting said bearing ring, a substantially ellipsoidal nozzle independently rotatable in the bearing ring, an air passage of Venturi tube form through the nozzle, trunnions on the nozzle in the line of its axis of generation, and bearings in the bearing ring for the trunnions on which the nozzle can rotate in the bearing ring at right angles to the axis of rotation of the bearing ring.

4. An air directing device comprising, in combination, a bearing ring, a fixed circular coaming in which said bearing ring is rotatable, a substantially ellipsoidal nozzle, a socket therefor in the bearing ring and conforming partially to the shape of the nozzle, trunnions on the nozzle in the line of its axis of generation, bearings in the bearing ring for said trunnions along a diameter of the bearing ring, and an air passage of Venturi tube form through the nozzle.

5. An air directing device comprising, in combination, a bearing ring, means for rotatably supporting said bearing ring, a substantially ellipsoidal nozzle independently rotatable in the bearing ring, an air passage through the nozzle, trunnions on the nozzle in the line of its axis of generation, bearings in the bearing ring for the trunnions on which the nozzle can rotate in the bearing ring at right angles to the axis of rotation of the bearing ring and means for closing wholly or partially the air passage through the nozzle.

6. An air directing device comprising, in combination, a bearing ring, a fixed circular coaming in which said bearing ring is rotatable, a substantially ellipsoidal nozzle, a socket therefor in the bearing ring and conforming partially to the shape of the nozzle, an extension on the socket, trunnions on the nozzle in the line of its axis of generation, bearings in the bearing ring for said trunnions along a diameter of the bearing ring and a tubular air passage through the nozzle adapted to be closed wholly or partially by the extension of the socket.

7. An air directing device comprising, in combination, a bearing ring, a fixed circular coaming in which said bearing ring is rotatable, a substantially ellipsoidal nozzle, a socket therefor in the bearing ring and conforming partially to the shape of the nozzle, an extension on the socket, trunnions on the nozzle in the line of its axis of generation, bearings in the bearing ring for said trunnions along a diameter of the bearing ring, and an air passage of Venturi tube form through the nozzle adapted to be closed wholly or partially by the extension of the socket.

8. An air directing device comprising, in combination, a bearing ring, a fixed circular coaming in which said bearing ring is rotatable, a substantially ellipsoidal nozzle, a socket therefor in the bearing ring and conforming partially to the shape of the nozzle, an extension on the socket, trunnions on the nozzle in the line of its axis of generation, bearings in the bearing ring, an air passage of Venturi tube form through the nozzle adapted to be closed wholly or partially by the extension of the socket and two handles projecting from the nozzle and clear of the air passage therethrough.

In testimony whereof I affix my signature.

THOMAS NEILSON.